United States Patent
Agamy et al.

(10) Patent No.: US 10,211,747 B2
(45) Date of Patent: Feb. 19, 2019

(54) SYSTEM AND METHOD FOR OPERATING A DC TO DC POWER CONVERTER

(71) Applicant: General Electric Company, Schenectady, NY (US)

(72) Inventors: Mohammed Agamy, Niskayuna, NY (US); Dong Dong, Niskayuna, NY (US); Yan Pan, Niskayuna, NY (US); Luis Jose Garces, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/061,717

(22) PCT Filed: Jan. 15, 2016

(86) PCT No.: PCT/US2016/013570
§ 371 (c)(1),
(2) Date: Jun. 13, 2018

(87) PCT Pub. No.: WO2017/123241
PCT Pub. Date: Jul. 20, 2017

(65) Prior Publication Data
US 2018/0367051 A1    Dec. 20, 2018

(51) Int. Cl.
*H02M 3/335*    (2006.01)
*H02M 3/337*    (2006.01)
(Continued)

(52) U.S. Cl.
CPC ....... *H02M 3/33584* (2013.01); *H02M 1/088* (2013.01); *H02M 3/3376* (2013.01);
(Continued)

(58) Field of Classification Search
CPC ......... H02M 3/33569; H02M 3/33507; H02M 2007/4815; H02M 2007/4818; H02M 1/083; H02M 3/33538; H02M 3/33546
See application file for complete search history.

(56) References Cited

U.S. PATENT DOCUMENTS

| 5,027,264 A | 6/1991 | Dedoncker et al. |
| 5,276,376 A | 1/1994 | Puskas |

(Continued)

FOREIGN PATENT DOCUMENTS

| CN | 102611319 A | 7/2012 |
| CN | 203482096 U | 3/2014 |

(Continued)

OTHER PUBLICATIONS

Haoning, "LLC Resonant Current Doubler Converter", Masters Thesis, University of Canterbury, Christchurch, New Zealand, 2012.

(Continued)

*Primary Examiner* — Adolf Berhane
*Assistant Examiner* — Afework Demisse
(74) *Attorney, Agent, or Firm* — GE Global Patent Operation; Scott R. Stanley

(57) ABSTRACT

A direct current (DC) to DC power converter includes a first bus converter for converting a first DC bus voltage into a first high frequency AC voltage and a second bus converter for converting a second high frequency alternating current (AC) voltage into a second DC bus voltage. The DC to DC converter also includes a resonant circuit for coupling the first bus converter and the second bus converter and a controller for providing switching signals to the first bus converter and the second bus converter to operate the power converter in a soft switching mode. The controller includes a switching frequency controller for determining a switching frequency signal for the power converter based on a refer- (Continued)

ence output current and a phase shift controller for determining a phase shift signal for the power converter. When the reference output current is lower than the a first load current value the switching frequency signal is maintained at a first switching frequency and the phase shift is determined according to the reference output current. Further, when the reference output current is above a second load current value the switching frequency signal is maintained at a second switching frequency and the phase shift is determined according to the reference output current. When the reference output current is between the first load current value and the second load current value, the switching frequency signal is adjusted according to a value of the reference output current and the phase shift is determined based on the switching frequency, the reference output current and perturbations in the output current.

22 Claims, 9 Drawing Sheets

(51) Int. Cl.
    *H02M 1/088*     (2006.01)
    *H02M 1/34*     (2007.01)
    *H02M 1/00*     (2006.01)

(52) U.S. Cl.
    CPC .............. *H02M 2001/0058* (2013.01); *H02M 2001/348* (2013.01)

(56) References Cited

U.S. PATENT DOCUMENTS

| | | | |
|---|---|---|---|
| 5,500,791 | A | 3/1996 | Kheraluwala et al. |
| 8,514,593 | B2 | 8/2013 | Brinlee et al. |
| 8,587,963 | B2 | 11/2013 | Nan et al. |
| 8,587,975 | B2 | 11/2013 | Jain et al. |
| 8,593,831 | B2 | 11/2013 | Rojas et al. |
| 8,811,039 | B2 | 8/2014 | Ngo et al. |
| 8,848,409 | B2 | 9/2014 | Dujic et al. |
| 2008/0212340 | A1 | 9/2008 | Tao et al. |
| 2012/0063177 | A1* | 3/2012 | Garrity .................. H02J 3/383 363/37 |
| 2012/0236610 | A1 | 9/2012 | Lee et al. |
| 2013/0187472 | A1 | 7/2013 | Taurand et al. |
| 2013/0234669 | A1 | 9/2013 | Huang et al. |
| 2013/0265804 | A1 | 10/2013 | Fu et al. |
| 2013/0314950 | A1 | 11/2013 | Hembach et al. |
| 2014/0003095 | A1 | 1/2014 | Thomas et al. |
| 2014/0185328 | A1 | 7/2014 | Rosado et al. |
| 2015/0049518 | A1 | 2/2015 | Harrison et al. |
| 2015/0109827 | A1 | 4/2015 | Poshtkouhi et al. |
| 2015/0146455 | A1 | 5/2015 | Engel et al. |

FOREIGN PATENT DOCUMENTS

| | | |
|---|---|---|
| EP | 2001113 A2 | 12/2008 |
| EP | 2823781 A1 | 1/2015 |
| EP | 2827467 A2 | 1/2015 |
| WO | 2014050354 A1 | 4/2014 |
| WO | 2014070998 A1 | 5/2014 |

OTHER PUBLICATIONS

Zhao et al., "Overview of Dual-Active-Bridge Isolated Bidirectional DC-DC Converter for High-Frequency-Link Power-Conversion System", IEEE Transactions on Power Electronics, vol. 29, Issue 8, pp. 4091-4105, Aug. 2014.

International Search Report and Written Opinion issued in connection with corresponding PCT application No. PCT/US2016/013570 dated Jun. 15, 2016.

* cited by examiner

SYSTEM AND METHOD FOR OPERATING A DC TO DC POWER CONVERTER

BACKGROUND

Embodiments of the invention relate generally to power converters and more specifically to system and method for operating a direct current (DC) to DC power converter.

DC to DC power converters are very prevalent in today's power system. There are many applications of DC to DC converters, e.g., power supplies for cell phones, laptops etc. Even in hybrid electric vehicles or military/civil aircrafts DC to DC converters may be used. For offshore applications, such as marine, there are variety of loads which may be fed by DC power supply. In such marine ships, many DC buses which are interconnected so as to transfer power therebetween may be utilized. The interconnections between DC buses require coupling the DC buses with DC to DC converters. Generally, the efficiency of the overall marine power architecture needs to be high which in turn requires highly efficient DC to DC converters. Thus, in many embodiments, soft switching is employed for controlling DC to DC converters. Soft switching of DC to DC converters reduces switching losses of the DC to DC converters.

In marine ships, where the power requirements are high, the DC to DC converters may need to be operated at high voltages. Since the DC to DC converters need to be operated at high voltages, in many embodiments, a plurality of series connected semiconductor devices are utilized. With the large number of semiconductor devices in series and their associated snubber circuit, conventional control method will lead to loss of soft switching and lower converter efficiency and consequently forcing a lower frequency and lower power density design.

Therefore, it is desirable to provide a system and a method that will address the foregoing issues.

BRIEF DESCRIPTION

In accordance with an embodiment of the present technique, a direct current (DC) to DC power converter is provided. The DC to DC power converter includes a first bus converter for converting a first DC bus voltage into a first high frequency AC voltage and a second bus converter for converting a second high frequency alternating current (AC) voltage into a second DC bus voltage. The DC to DC power converter further includes a resonant circuit for coupling the first bus converter and the second bus converter and a controller for providing switching signals to the first bus converter and the second bus converter to operate the power converter in a soft switching mode. The controller includes a switching frequency controller for determining a switching frequency signal for the power converter based on a reference output current and a phase shift controller for determining a phase shift signal for the power converter. The switching frequency controller maintains the switching frequency signal at a first switching frequency when the reference output current is below a first load current value the and when the reference output current is above a second load current value the switching frequency controller maintains the switching frequency signal at a second switching frequency. When the reference output current is between the first load current value and the second load value, the switching frequency signal is adjusted according to a value of the reference output current. Further, the phase shift controller determines the phase shift according to the reference output current when the reference output current is lower than the first load current or higher than the second load current and when the reference output current is between the first load current and the second load current, the phase shift controller determines the phase shift based on the switching frequency, the reference output current and perturbations in the output current.

In accordance with another embodiment of the present technique, a method of operating a DC to DC power converter having a first bus converter coupled to a second bus converter by a resonant circuit is provided. The method includes adjusting a switching frequency of the power converter according to a reference output current when the reference output current is in between a first load current value and a second load value and maintaining the switching frequency of the power converter at a first switching frequency when the reference output current is lower than a first current value. Further, the method includes determining a phase shift value for the power converter based on the reference output current, wherein when the reference output current is lower than the first load current or higher than the second load current the phase shift is determined according to the reference output current, and wherein when the reference output current is between the first load current and the second load current the phase shift is determined based on the switching frequency, the reference output current and perturbations in the output current.

In accordance with yet another embodiment of the present technique, a power system for a marine application is provided. The power system includes an alternating current (AC) bus connected to a generator and supplying power to an auxiliary load and a first direct current (DC) bus having a first DC voltage supplying power to a first load. The power system also includes an AC to DC converter coupled between the AC bus and the first DC bus, a second DC bus having a second DC voltage supplying power to a second load and a DC to DC converter coupled between the first DC bus and the second DC bus. The DC to DC converter includes a first bus converter for converting a first DC bus voltage into a first high frequency AC voltage and a second bus converter for converting a second high frequency alternating current (AC) voltage into a second DC bus voltage. The DC to DC converter also includes a resonant circuit for coupling the first bus converter and the second bus converter. The power system further includes a controller for providing switching signals to the first bus converter and the second bus converter to operate the power converter in a soft switching mode. The controller includes a switching frequency controller for determining a switching frequency signal for the power converter based on a reference output current and a phase shift controller for determining a phase shift signal for the power converter. The switching frequency controller maintains the switching frequency signal at a first switching frequency when the reference output current is below a first load current value the and when the reference output current is above a second load current value the switching frequency controller maintains the switching frequency signal at a second switching frequency. When the reference output current is between the first load current value and the second load value, the switching frequency signal is adjusted according to a value of the reference output current. Further, the phase shift controller determines the phase shift according to the reference output current when the reference output current is lower than the first load current or higher than the second load current and when the reference output current is between the first load current and the second load current, the phase shift controller determines the phase shift based on the switching frequency, the reference output current and perturbations in the output current.

DRAWINGS

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings. The connections may include direct connections. Furthermore, the terms "circuit" and "circuitry" and "controller" may include either a single component or a plurality of components, which are either active and/or passive and are connected or otherwise coupled together to provide the described function.

Figure 1:
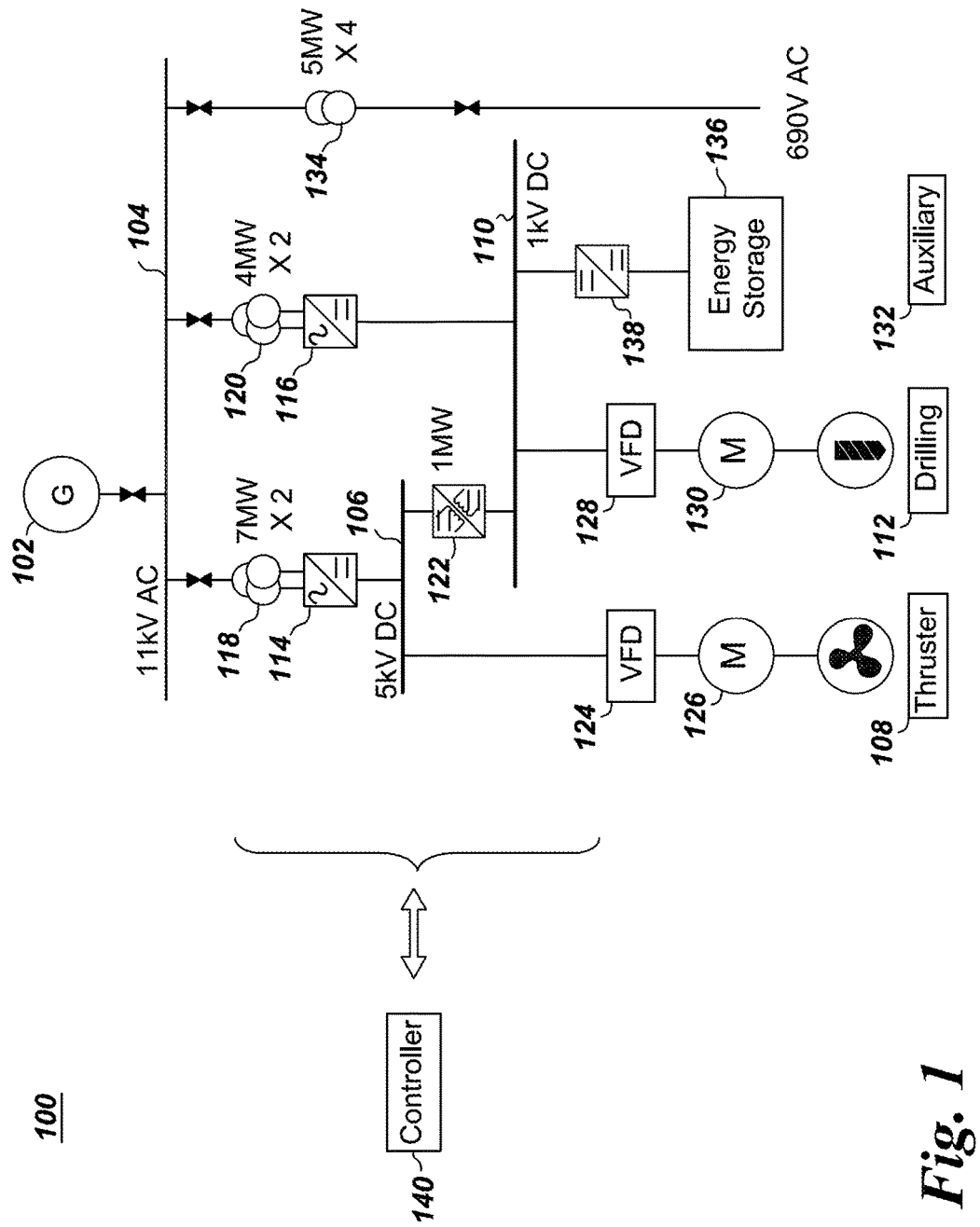
FIG. 1 is a diagrammatical representation of a power system for a marine ship, according to aspects of the present disclosure.

Turning now to the drawings, by way of example in FIG. 1, a power system 100 for a marine ship is depicted. In one embodiment, the power system 100 includes one or more generators 102 coupled to one or more alternating current (AC) buses 104. The generator 102 includes an AC generator which generates AC power for the marine ship. The AC bus 104 supplies power to an auxiliary load 132 via a transformer 134. The auxiliary load 132 may operate at lower voltage compared to the AC voltage of the AC bus 104. Therefore, the transformer 134 reduces the AC voltage of the AC bus to the level suitable for the auxiliary load 132. In one embodiment, the auxiliary load may include service load.

The power system 100 further includes a first direct current (DC) bus 106 having a first DC voltage to supply power to a first load 108. Further, a second DC bus 110 having a second DC voltage supplies power to a second load 112. The AC bus 104 supplies power to the first and second DC buses 106, 110. Further, in one embodiment, first and second DC buses 106, 110 may receive power from different AC buses. For example, in an embodiment, first DC bus 106 may receive power from AC bus 104 whereas second DC bus 110 may receive power from another AC bus different from AC bus 104. The first load 108 may include a Thruster load and the second load 112 may include a drilling load. In one embodiment, the second DC voltage is lower than the first DC voltage. The first load 108 may be operated and controlled by a variable frequency drive 124 which controls a first load motor 126. Similarly, the second load 112 may also be operated and controlled by another variable frequency drive 128 which controls a second load motor 130.

Furthermore, a first AC to DC converter 114 couples the AC bus 104 and the first DC bus 106. Similarly, a second AC to DC converter 116 couples the AC bus 104 and the second DC bus 110. In one embodiment, transformers 118 and 120 are connected between the AC bus 104 and first and second AC to DC converters 114, 116 respectively to reduce the AC voltage level of the AC bus 104 that is supplied to AC to DC converters 114, 116. It should be noted that if in one embodiment, the AC voltage level matches the voltage of AC to DC converters 114, 116 then the AC bus 104 can be directly connected to the AC to DC converters without transformers.

A first DC to DC converter 122 is coupled between the first DC bus 106 and the second DC bus 110. The first DC to DC converter 122 includes a bidirectional converter and can transfer power either from first DC bus 106 to second DC bus 110 or vice versa. Furthermore, the DC to DC converter 122 includes a high frequency DC to DC converter.

In one embodiment, an energy storage device 136 may be coupled to the second DC bus 110 via a power electronic converter 138 to supply DC power to the second DC bus 110. In another embodiment, the energy storage device 136 may be coupled to the first DC bus 106. In yet another embodiment, energy storage devices may be coupled to both the first DC bus 106 and the second DC bus 110. Further, in some embodiments, energy storage may not be utilized or connected to any of the first or second DC buses 106, 110. The power electronic converter 138 may be utilized to match the voltages of energy storage device and the DC bus 110.

Power System 100 further includes a controller 140 to control the operation of AC to DC converters 114, 116, DC to DC converter 122 and other elements of the power system 100. It should be noted that even though a single controller 140 is shown in the embodiment of FIG. 1, in other embodiments controller 140 may be split into a plurality of controllers and each individual controller may control a part of the power system 140. Power system 100 may also include passive devices such as fuses and/or circuit breakers (not shown) to protect a second of the power system 100 during a fault (e.g., short circuit fault).

It should be noted that FIG. 1, is a single line diagram of DC power system 100. In other words, converters 122, 138 have been shown to have only one DC input terminal and one DC output terminal for ease of explanation. However, a negative terminal or a reference terminal is always there at the input and the output of converters 122, 138. Similarly, DC buses 106, 110 include a positive rail and a negative rail but for ease of explanation only one line is shown.

In accordance with an embodiment of the present technique, a control technique for DC to DC converter 122 of FIG. 1 is disclosed. Generally it is required to have high efficiency for all converters and thus, the control technique presented herein discloses a method for soft switching the DC to DC converter 122 in a highly efficient manner.

Figure 2:
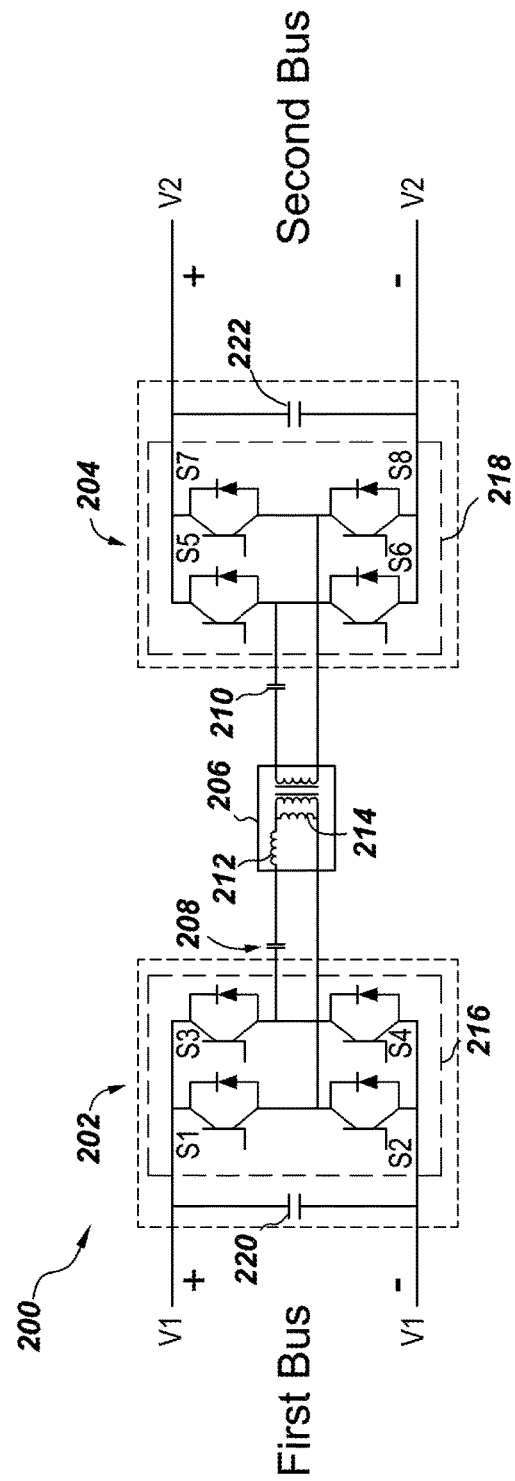
FIG. 2 is a schematic representation of a DC to DC converter of FIG. 1, according to aspects of the present disclosure.

FIG. 2 shows a schematic representation of a DC to DC converter 200 such as DC to DC converter 122 of FIG. 1, in accordance with an embodiment of the present technique. DC to DC converter 400 is a high frequency (e.g., 500 Hz to 100 kHz) converter. Further, DC to DC converter 200 is a resonant LLC dual active bridge converter, where resonant LLC refers to a resonant circuit formed by a series connection of one inductor L and capacitor C, in parallel with another inductor L. Conventional DC to DC converters utilize a hard switching technique (i.e., switching waveforms of their switching devices are square waveforms) and therefore they have high switching losses as they switch at about the peak voltage or current values of square waveforms. As compared to these conventional converters, the resonant LLC dual active bridge converter described herein utilize a soft switching technique i.e., the switching devices in resonant LLC dual bridge converter switch at close to zero voltage or zero current because of the resonant circuit formed by inductor and capacitor components. In other words, in one embodiment, the LLC resonant circuit of the DC to DC converter 200 creates an oscillating current waveform that lags the voltage waveform. This helps in discharging a switching device capacitance before the actual switching and thus, in achieving zero voltage switching. Thus, the devices can then turn ON or OFF at a low voltage or a low current instead of the high voltage or the high current (because of sharp rise of voltage/current in square waveforms) in conventional converters which do not use any soft switching technique.

In the embodiment shown, DC to DC converter 200 is connected between a first bus (e.g., bus 106 of FIG. 1) and a second bus (e.g., bus 110 of FIG. 1) and includes a DC to high frequency AC conversion stage followed by a high frequency AC to DC conversion stage. DC to DC converter 200 is a bidirectional converter, i.e., DC to DC converter 200 allows power transfer from the first bus to the second bus and vice versa. Specifically, DC to DC converter 200 includes a first bus converter 202 and a second bus converter 204. First bus converter 202 and second bus converter 204 are coupled to each other via a high or medium frequency transformer 206, resonant capacitors 208, 210 and resonant inductors 212 and 214. First bus converter 202 and second bus converter 204 include full bridge converters 216 and 218 respectively and DC bus capacitors 220, 222 on their DC sides as shown. Full bridge converter 216 includes a plurality of switching devices S1, S2, S3 and S4. Similarly, full bridge converter 218 includes a plurality of switching devices S5, S6, S7 and S8. The switching devices may include any controllable semiconductor switches such as an Insulated Gate Bipolar Transistor (IGBT), a metal oxide semiconductor field effect transistor, a field effect transistor, a gate turn-off thyristor, an insulated gate commutated thyristor, an injection enhanced gate transistor, a silicon carbide based switch, a gallium nitride based switch, a gallium arsenide based switch, or combinations thereof. Further, in one embodiment, transformer 206 may not be employed and resonant components and first bus converter 202 and second bus converter 204 may be directly connected to each other without any isolation.

A first resonant capacitor 208 is connected in series with a first resonant inductor 212 and the terminals of a second resonant inductor 214 are connected in parallel to a first winding of the transformer 206. The first winding of the transformer receives a first high frequency AC voltage from first bus converter 202. Further, terminals of the series connection of the first resonant inductor 212 and first resonant capacitor 208 are connected between one AC output terminal of first bus converter 202 and one input terminal of transformer 206. A second resonant capacitor 210 is connected is connected between one output terminal of a second winding of transformer 206 and one AC input terminal of second bus converter 204. The second winding of the transformer provides a second high frequency AC voltage to the second bus converter 204. The second high frequency AC voltage is determined by transformer turns ratio and the first high frequency AC voltage. When the switching devices are switched ON or OFF, a resonant circuit formed by inductors and capacitors produce oscillating current through the switching devices and thus soft switching can be achieved. It should be noted that resonant inductors 212 and 214 may be part of the transformer 206 itself. For example, inductor 212 may represent leakage inductance of transformer 206 and inductor 214 may represent magnetic inductance of the transformer 206. In one embodiment, both inductors 212 and 214 can be placed on both sides of transformer 206.

In operation, if the power needs to be transferred from the first bus to second bus then first bus converter 202 will act as a DC to high frequency AC converter and second bus converter 204 will act as a high frequency AC to DC converter. In this case, first bus converter 202 converts an input DC voltage V1 (also referred to as a first bus voltage) into medium/high frequency AC voltage and second bus converter 204 converts medium/high frequency AC voltage into an output DC voltage V2 (also referred to as a second bus voltage). Similarly, if the power needs to be transferred from the second bus to the first bus then second bus converter 204 will act as a DC to high frequency AC converter and first bus converter 202 will act as a high frequency AC to DC converter. Transformer 206 provides a coupling between AC connections of first bus converter 202 and AC connections of second bus converter 204. Further, the resonant circuit formed by inductors 212, 214 and capacitors 208, 210 provides soft switching of switching devices as explained earlier.

Figure 3:
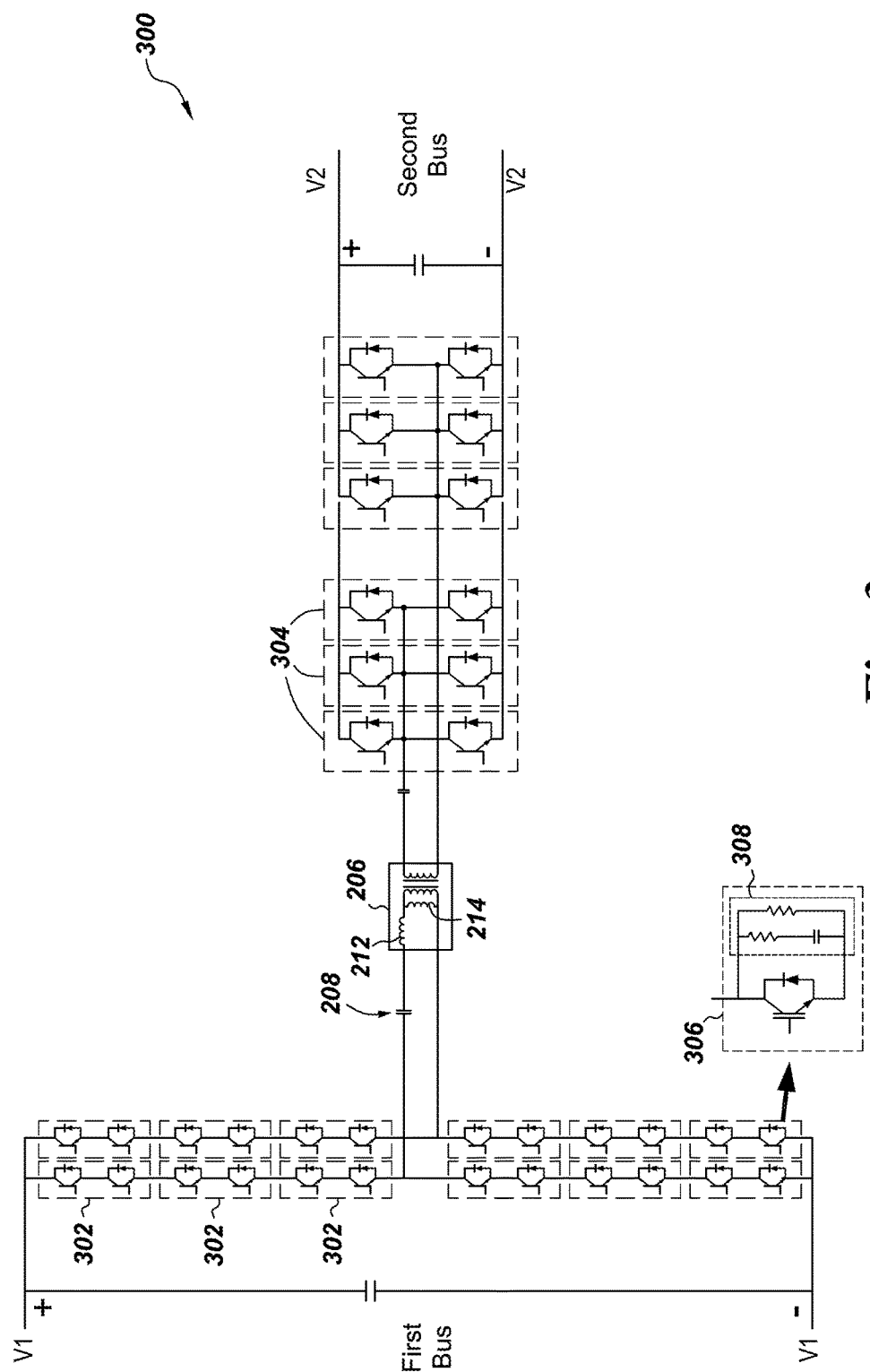
FIG. 3 is a schematic representation of a resonant LLC dual active bridge converter, according to aspects of the present disclosure.

FIG. 3 shows a schematic representation of a resonant LLC dual active bridge converter 300 in accordance with an embodiment of the present technique. In converter 300 of FIG. 3, each switching device (i.e., S1, S2, S3, S4) of full bridge converter 216 (FIG. 2) is replaced with series connected switching modules 302. In another embodiment, each switching device may be replaced with series connected semiconductor switches having snubber circuits. This provides a higher voltage capability for full bridge converter 216 as the series connected switching devices together can withstand higher voltages while still enabling high frequency switching. Further, each switching device (i.e., S5, S6, S7, S8) of full bridge converter 218 (FIG. 2) is replaced with three parallel connected switching devices 304. This provides a higher current capability for IGBT converter 219 as the parallel connected switching devices together can carry higher current. The switching devices may be include any controllable semiconductor switches such as an IGBT, a metal oxide semiconductor field effect transistor, a field effect transistor, a gate turn-off thyristor, an insulated gate commutated thyristor, an injection enhanced gate transistor, a silicon carbide based switch, a gallium nitride based switch, a gallium arsenide based switch, or combinations thereof.

FIG. 3 also shows a detailed view of one switching device 306 among the series connected switching devices. As can be seen, the switching device 306 includes a snubber circuit 308 across its terminals to ensure proper voltage sharing between all the series connected switching devices. The snubber circuit 308 includes a RC snubber. In another embodiment, snubber circuit 308 may include a RCD snubber. This snubber circuit of each of the switching devices adds more restrictions on the converter in order to provide soft switching.

Figure 4:
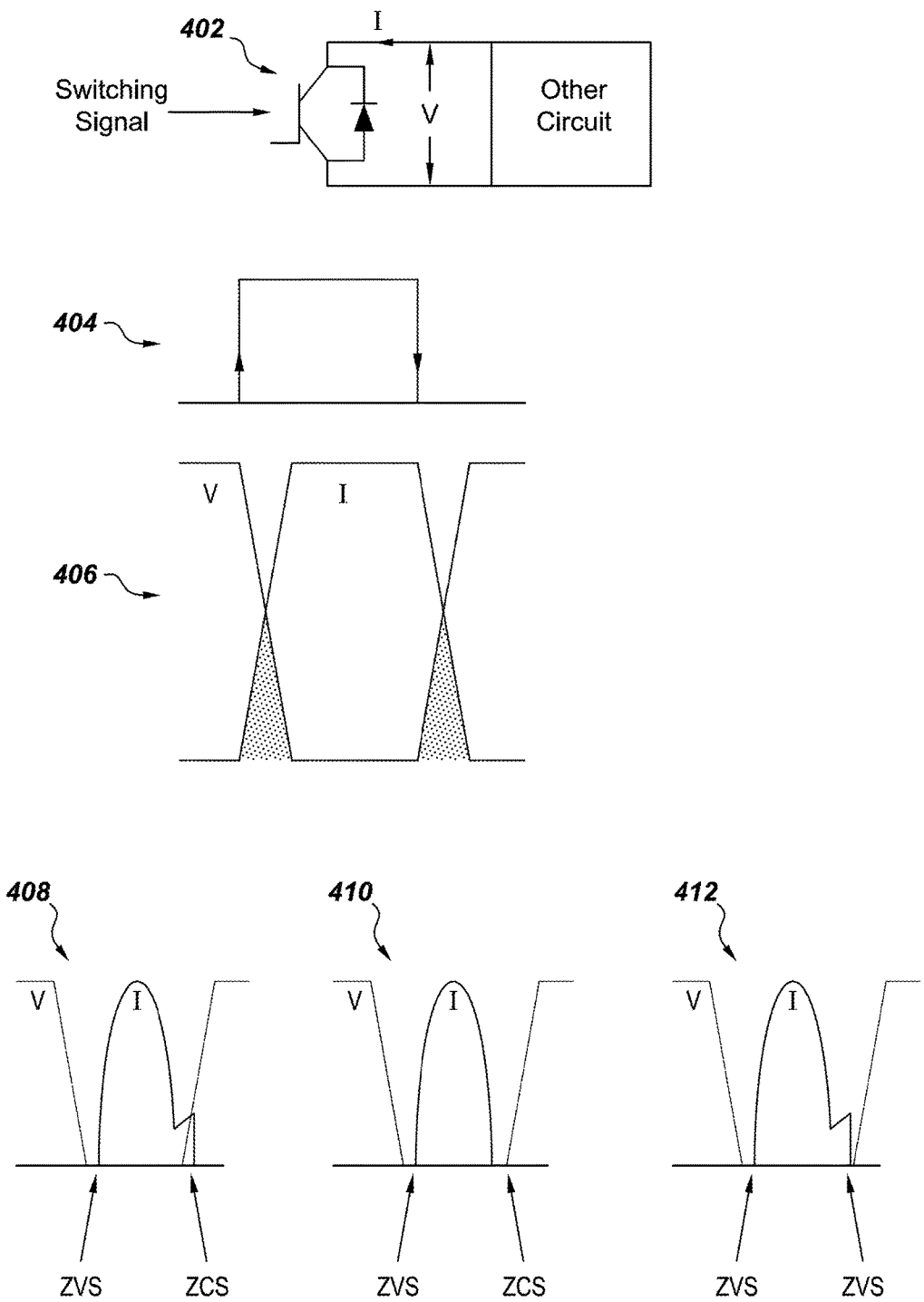
FIG. 4 is a diagrammatical representation of switching waveforms of a controllable semiconductor device.

FIG. 4 shows switching waveforms of a controllable semiconductor device. A controllable semiconductor switch 402 is turned on when its switching signal (i.e., a gate drive signal) is made high. In the embodiment shown, when the controllable semiconductor switch 402 is off, the voltage across it is V and when the controllable semiconductor switch 402 is on, the current in it is I. A graphical plot 404 is of one such switching signal for controllable semiconductor switch 402. Further, a graphical plot 406 is of current I and voltage V switching waveforms for the controllable semiconductor switch 402 when hard switching is employed and graphical plots 408, 410, 412 are of similar switching waveforms when soft switching is employed. Graphical plots 408, 410, 412 shows the switching waveforms when different types of snubber circuits are employed. For example, graphical plot 408 corresponds to an embodiment where a small snubber circuit or no snubber circuit is employed along with the resonant circuit whereas graphical plot 412 corresponds to an embodiment where a large snubber circuit is employed.

When the switching signal 404 is made high, controllable semiconductor switch 402 starts to turn on based on the device characteristics. As the switch 402 starts turning on, the voltage V across it starts reducing to a device saturation voltage which is close to zero (e.g., 2 to 4 volts) as shown in plots 406, 408, 410 and 412. In case of hard switching, the current also immediately starts flowing through switch 402 and thus, plot 406 shows current switching waveform going up while voltage switching waveform going down. Once the switch 402 is fully turned on, the current (I) becomes high and the voltage (V) becomes low. It should be noted that the terms high and low here refer to high and low values of corresponding waveforms. During this transition, as the current I and voltage waveform V overlap there is switching loss (VI) in switching device 402. This switching loss is shown in plot 406 by a shaded portion.

In case of soft switching, as shown in plot 408, when the switching signal 404 becomes high, the current I may not be positive immediately rather because of the resonance circuit, the current rise may be delayed for a while. The current I may also be negative for a while to start with. This is due to the current lagging the voltage because of the resonance circuit. The antiparallel diode D getting provides a path for the negative current until it changes polarity. As compared to plot 406, there is no positive switching loss VI of switching device 402 in plot 408. The reason for that is when the voltage starts reducing, the current is still not positive and so the overlapping period between positive current I and voltage V waveforms in case of soft switching is not there. This is called as zero voltage switching (ZVS) as the current I starts rising and becomes positive only after voltage V is about zero.

When the switching device 402 needs to be turned off, the switching signal is lowered. In case of hard switching as in plot 406, the current (I) then starts reducing immediately and the voltage V starts rising immediately. On the other hand in case of soft switching, as in plot 408, the current I decrease starts before the voltage V starts rising and the overlap period between current I and voltage V is very small. This results in reduced turn off losses for the switching device.

As compared to graphical plot 408, in graphical plot 410, the current I starts at zero after the voltage V has become zero and further, voltage V starts rising during turn on process only after current I has reduced to zero. This is called as zero current switching (ZCS) as the voltage starts rising after the current has been reduced to about zero value. Further, in graphical plot 412, compared to plot 410, the current is zero during turn on process but the time duration between the zero current and the voltage rising instance is almost nil.

It should be noted that soft switching waveforms 408 shown in FIG. 4 are example waveforms and generally, achieving the perfect waveforms is a difficult task. In many cases, either only ZCS is employed or only ZVS is employed. Further, when the switching devices are connected in series as discussed with respect to FIG. 3, controlling the current and voltage rising instances with a single resonant circuit becomes even more difficult because snubber circuits of series connected switching devices interfere with the performance of the resonant circuit. In accordance with an embodiment of the present technique, these current rising and voltage rising instances are controlled so as to achieve soft switching even in presence of series connected switching devices. In the present technique, to control the current and voltage rising instances, a plurality of parameters are controlled. The plurality of control parameters include a switching frequency of switching devices, a phase shift between switching signals of the first bus converter and the second bus converter and a dead time between switching signals of a top and bottom switching devices of the converter leg.

Figure 5:
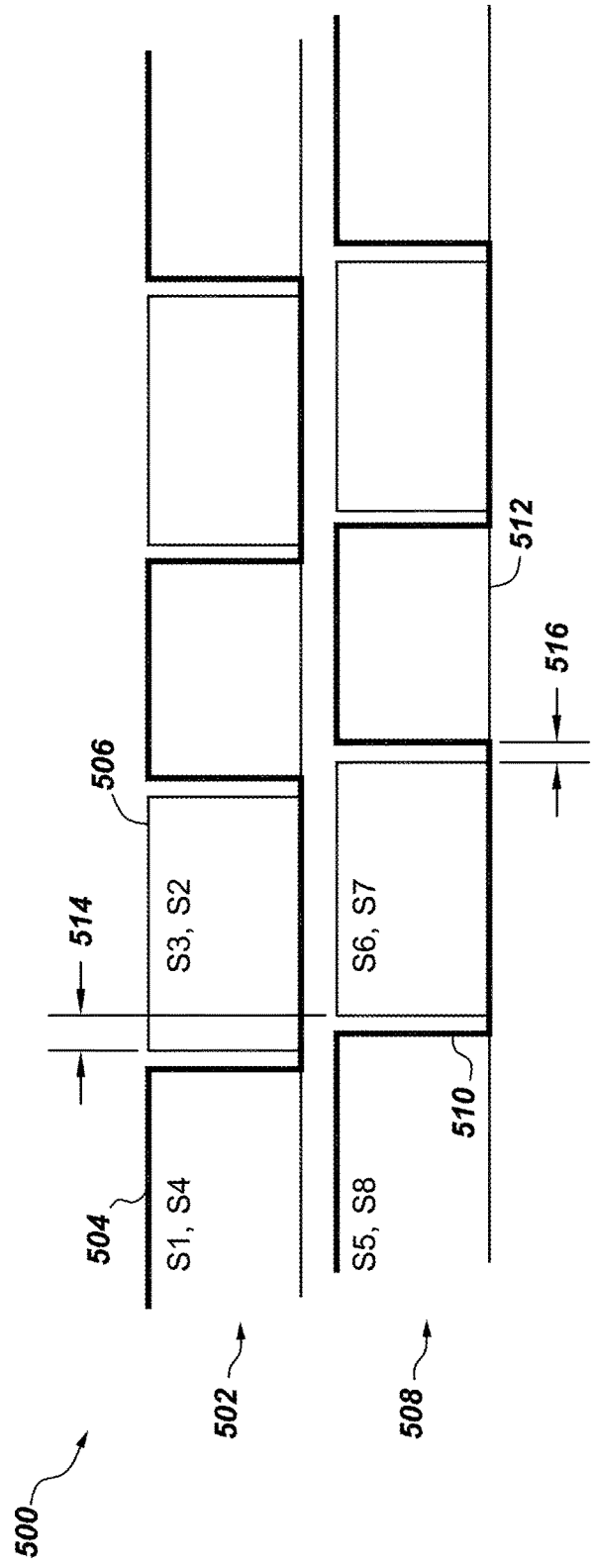
FIG. 5 is a graphical representation of switching signals for switching devices of a first bus converter and a second bus converter of FIG. 2, according to aspects of the present disclosure.

FIG. 5 shows a graphical representation 500 of switching signals for switching devices S1, S2, S3, S4, S5, S6, S7, S8 of first bus converter 202 and second bus converter 204 of FIG. 2. A graphical plot 502 represents a switching signal 504 for switching devices S1, S4 and a switching signal 506 for switching devices S3 and S2. Similarly, a graphical plot 508 represents a switching signal 510 for switching devices S5, S8 and a switching signal 512 for switching devices S6 and S7. As can be seen, the switching signals for switching devices S1 and S4 are same i.e., switching signal 504. Similarly, switching signals for each diagonal pair of switching devices (S2S3 or S5S8 or S6S7) is same. Further, switching signals of similarly located switching devices diagonal pairs of converters 202 and 204 (e.g., S1S4 and S5S8 or S2S3 and S6S7 etc.) may be high or low simultaneously. In other words diagonal switching devices pair S1S4 may be turned on simultaneously with diagonal switching devices pair S5S6. However, some delay (e.g., delay 514 between switching signals 506 and 512) may be introduced between these switching signals of similarly located diagonal pairs of switching devices. This delay refers to a phase shift between converter 202 and 204.

When the switching signal is high the corresponding switching device turns on. Thus, when switching signal 504 is high, switching devices S1 and S4 are turned on and the input voltage V1 gets applied across the resonant circuit formed by resonant inductors 212, 214 and resonant capacitors 208, 210. Similarly, when switching signal 506 is low, switching devices S2 and S3 are turned on and a negative voltage V1 may get applied across the resonant circuit.

Generally, all the switching devices in one converter leg are not turned on simultaneously because it will short circuit the bridge converter leg and thus, the corresponding capacitor will also be short circuited. Therefore, when switching device S1 is on, the switching signal for device S2 is made low, so that switching device S2 should not turn on while switching device S1 is on. During the transition period between switching device S1 getting turned off and switching device S2 getting turned on, a dead time (i.e., when no switching signal is high) is kept between the switching signals of switching devices S1 and S2. This dead time (e.g., dead time 516 between switching signals 510 and 512) affects the current and voltage waveforms generated by the resonant circuit.

The current and voltage waveform generated by the resonant circuit depend on the resonant circuit elements as well as the input signal across the resonant circuit and the load (i.e., output power) that needs to be supplied by the converter. For example, the on time of switching devices determine how long positive or negative voltage V1 may get applied across the resonant circuit and thus, can affect the current and voltage waveforms generated by the resonant circuit. Further, when no switching device is conducting, a zero voltage may get applied across the resonant circuit which may further shape the current and voltage waveforms. The on time of switching devices depends on switching frequency of converter 200 and the dead time. The current and voltage waveform also depend on the phase shift between switching signals of converter 202 and 204. Thus, if the switching frequency, phase shift, dead time or any combinations thereof are controlled, the resonant waveforms can be controlled and thus, soft switching can be achieved. It should be noted however, that as the switching frequency or phase shift are controlled it also affects the output power of converter 200. Thus, soft switching of converter 200 cannot be achieved at all switching frequencies and all phase shifts rather it is constrained by the required output power (also called as reference output power). The soft switching is also restrained by a frequency range as beyond this frequency range, the current/voltage waveforms generated by the resonant circuit may not be appropriate for ZVS or ZCS switching (also referred to as soft switching).

Further, the input and output voltages V1 and V2 are generally kept constant by controller 140. Thus, in order to control the required output power, the controller 140 controls required output current (also called as reference output current). In one embodiment of the present technique, a lookup table is prepared and saved in a memory of controller 140. The lookup table provides values of switching frequency and phase shift for converter 200 to achieve soft switching at a given reference output current and a given converter voltage gain i.e., a voltage ratio V1/V2. In another embodiment, a feedforward function may be utilized to provide the values of switching frequency and phase shift based on the reference output current and the converter voltage gain. The values of switching frequency and phase shift may include a frequency range and a phase shift range.

Figure 6:
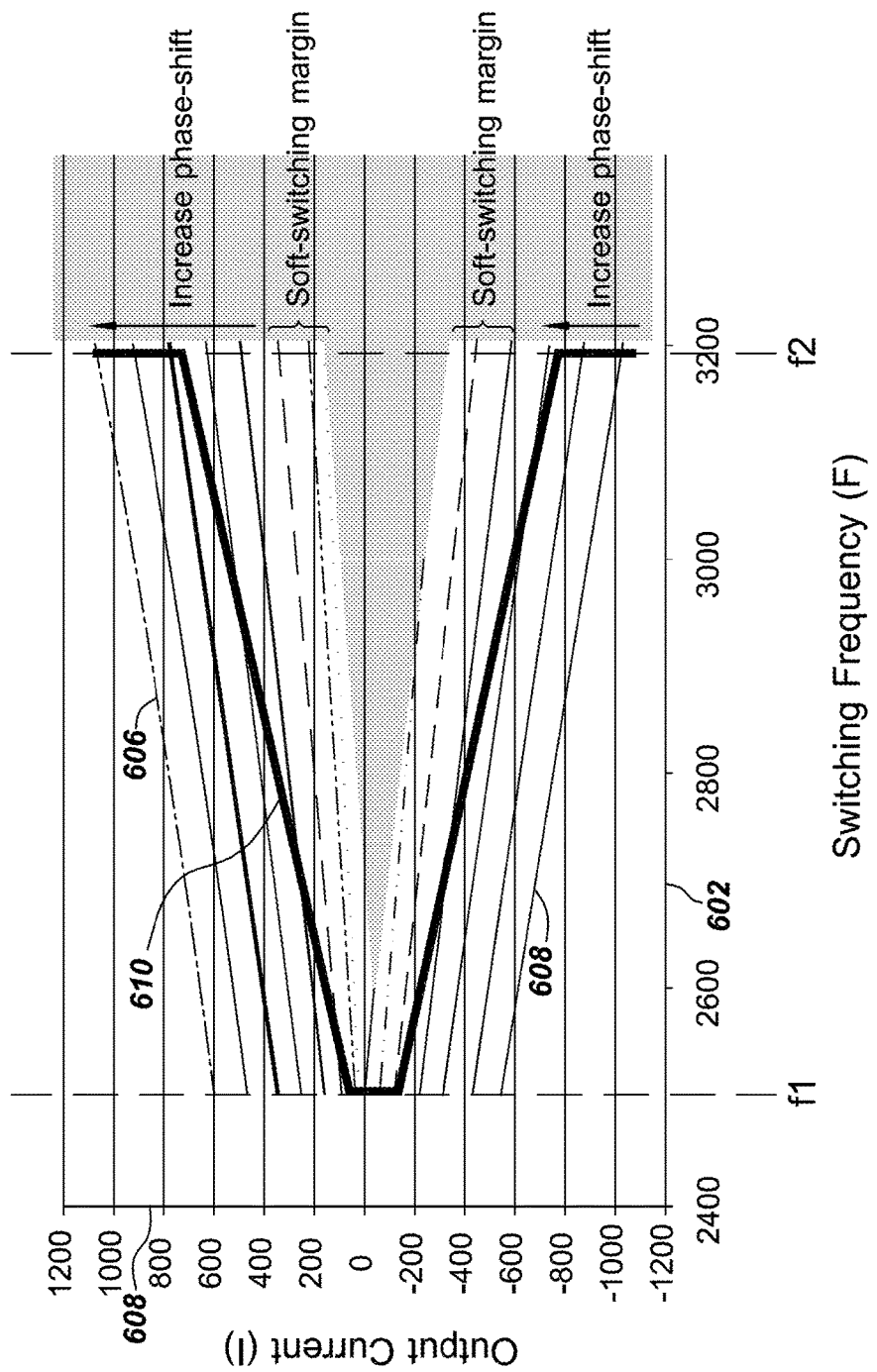
FIG. 6 is a graphical representation of a plurality of characteristics for the converter of FIG. 2, according to aspects of the present disclosure.

FIG. 6 is a graphical plot showing a plurality of characteristics for converter 200 of FIG. 2. A horizontal axis 602 on graphical plot 600 shows switching frequency of converter 200 in Hz and a vertical axis 604 shows output current (I) of converter 200. The plot 600 shows a plurality of curves for a plurality of phase shifts. For example, a topmost curve 606 represents the phase shift of 11.46 degrees whereas a bottommost curve 608 represents the phase shift of 37.24 degrees. The soft switching for converter 200 is generally possible between a frequency range f1-f2, where frequency f1 is a lower compared to frequency f2. The frequency f1 is referred to as a first switching frequency and f2 is referred to as a second switching frequency. First switching frequency f1 is determined based on system parameters and affects the size of the high frequency transformer 206. Further, second switching frequency f2 is determined based on a required converter voltage gain (V1/V2) and required output power. Second switching frequency f2 is an upper frequency limit for the required converter voltage gain V1/V2, i.e., beyond the switching frequency of f2, the voltage gain V1/V2 cannot be maintained. Similarly, first switching frequency f1 is a lower frequency limit for the required voltage gain V1/V2. If the converter switching frequency is decreased below the first switching frequency f1 then it result in the transformer saturation. If the second switching frequency f2 i.e., the frequency limit is lower it provides a higher voltage gain and if the second switching frequency f2 is higher then it provides higher current as the converter then operates near series resonance frequency. In general, the first and second frequencies f1 and f2 are chosen to be between an overall resonant circuit frequency and a series resonance frequency. The series resonance frequency is higher than the overall resonant circuit frequency and is dependent on series resonant components, e.g., resonant capacitors 208, 210 and series resonant inductor 212. The overall resonant circuit frequency is dependent on overall resonant circuit components e.g., resonant capacitors 208, 210 and resonant inductors 212, 214. In the embodiment shown, f1 is equal to 2500 Hz and f2 is equal to 3200 Hz. Beyond this frequency range, the current/voltage waveforms generated by the resonant circuit may not be appropriate for soft switching.

The soft switching region is also constrained by the load current. Generally at low load currents it is difficult to operate the converter at ZVS. Thus, as per the embodiment of FIG. 6, near output current of about zero ampere and above output current of about 1000 amperes, soft switching may not be possible in converter 200. In one embodiment, a soft switching characteristic 610 from plot 600 is selected and saved in a lookup table or provided as a feedforward function in advance of the real time control of converter 200. One factor that determines the soft switching characteristic 610 is the converter voltage gain V1/V2. The soft switching region may vary according to variation in required converter voltage gain and thus, the soft switching characteristic may also differ for different converter voltage gains. From the soft switching characteristic 610, which is stored in the lookup table, controller 140 determines at what switching frequency the converter 200 should operate at any given reference output current and the converter voltage gain. In one embodiment, the soft switching characteristic 610 can be defined as a predetermined characteristic representing values of converter switching frequencies and phase shifts for a plurality of output current values. In one embodiment, the soft switching characteristic 610 is selected such that at every point on the soft switching characteristic 610, controller 140 can control the phase shift precisely to obtain soft switching of converter 200. In other words, the soft switching characteristic 610 is selected such that it can provide a soft switching margin where the phase shift can be increased or decreased. It should be noted that in FIG. 6, the shaded region is where soft switching is lost.

In one embodiment, when the reference output current is higher than a second load current value, controller 140 keeps the converter switching frequency constant at the second switching frequency value (e.g., at f2) and varies only the converter phase shift to operate the converter 200 with soft switching at various current values. The second load current is predetermined and is a current value at the upper frequency limit (i.e., second switching frequency f2) for a given voltage gain V1/V2. For example, if the voltage V2 is 4.9 kV then the second load current value may be 204 A whereas if the voltage V2 is 5 kV then the second load current value may be 200 A. In other words, the second load current is a value, at the given voltage gain, on the soft switching characteristic beyond which the switching frequency is kept constant. Since the soft switching characteristic 610 provides a soft switching margin, controller 140 can easily control phase shift and achieve soft switching at these second load current values. It should also be noted that beyond the second load current, increasing the frequency is of no use, as the voltage gain then will not be sufficient to maintain the voltage ratio equal to V1/V2. Thus, phase shift control provides an additional control option even if the load current is high.

Further, when the reference output current is lower than a first load current value, controller 140 keeps the converter switching frequency constant (e.g., at f1) and controls the converter phase shift as well as the converter dead time (as defined with respect to FIG. 5). The first load current is the value which is about 10% of the rated load current and is determined based on system parameters. In one embodiment, the first load current value is predetermined and is a current value at the lower frequency limit (i.e., first switching frequency f1) for a given voltage gain V1/V2. The first load current may also be referred to as the minimum current value on the soft switching characteristic below which the switching frequency is kept constant at the first switching frequency value. At the first load current value, the margin to vary phase shift is limited as can be seen from soft switching characteristic 610, therefore, control of the converter dead time provides an addition control option at the first load current. It should also be noted that below the first load current, the frequency may need to be reduced to a value which is lower than f1, this will result in transformer saturation and thus, frequency cannot be decreased beyond the value f1.

Furthermore, when the reference output current is between the first and second load current values, controller 140 controls the frequency based on the voltage gain V1/V2 and also the reference output current. This is possible because in this range, there is scope to vary the frequency as the frequency has not hit its limit. In this region, i.e. between the first and second load currents, the phase shift control is used only for tuning the power flow or to compensate for perturbations in the output current (e.g., to compensate for ripple). The dead time control is generally not used in this region.

Figure 7:
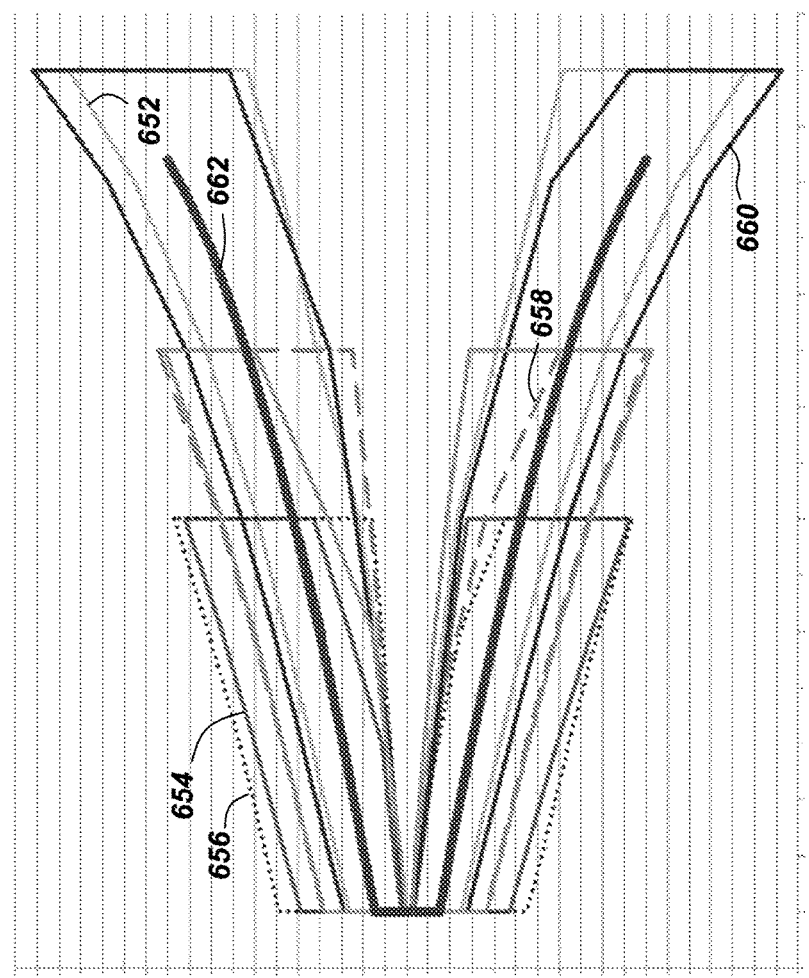
FIG. 7 is a graphical representation of a plurality of switching frequency regions corresponding to a plurality of converter voltage gains, according to aspects of the present disclosure.

FIG. 7 is a graphical plot showing a plurality of switching frequency regions corresponding to a plurality of converter voltage gains. In the graphical plot, a horizontal axis on the graphical plot shows a switching frequency of the converter and a vertical axis shows output current (I) of the converter. Further, the graphical plot shows a plurality of switching frequency regions 652, 654, 656, 658, 660, 662 corresponding to a plurality of converter voltage gains of converter 200 (FIG. 2). Each of these regions is similar to the plot 600 in FIG. 6. In other words, each of these regions may include a plurality of curves corresponding to a plurality of phase shifts and further, a soft switching characteristic, (e.g., characteristic 664) is selected for each region. This plot shows how the required voltage gain may change the value of the second switching frequency f2. For example, frequency region 652 corresponds to a voltage gain (V1/V2) of 1 kV/5 kV and in this case, the second switching frequency f2 is equal to 4000 Hz. Frequency region 654 corresponds to a voltage gain of 0.9 kV/5.5 kV and in this case, the second switching frequency f2 is about 3200 Hz. Thus, it can be seen that the voltage gain affects the upper switching frequency limit i.e., the second switching frequency f2.

Figure 8:
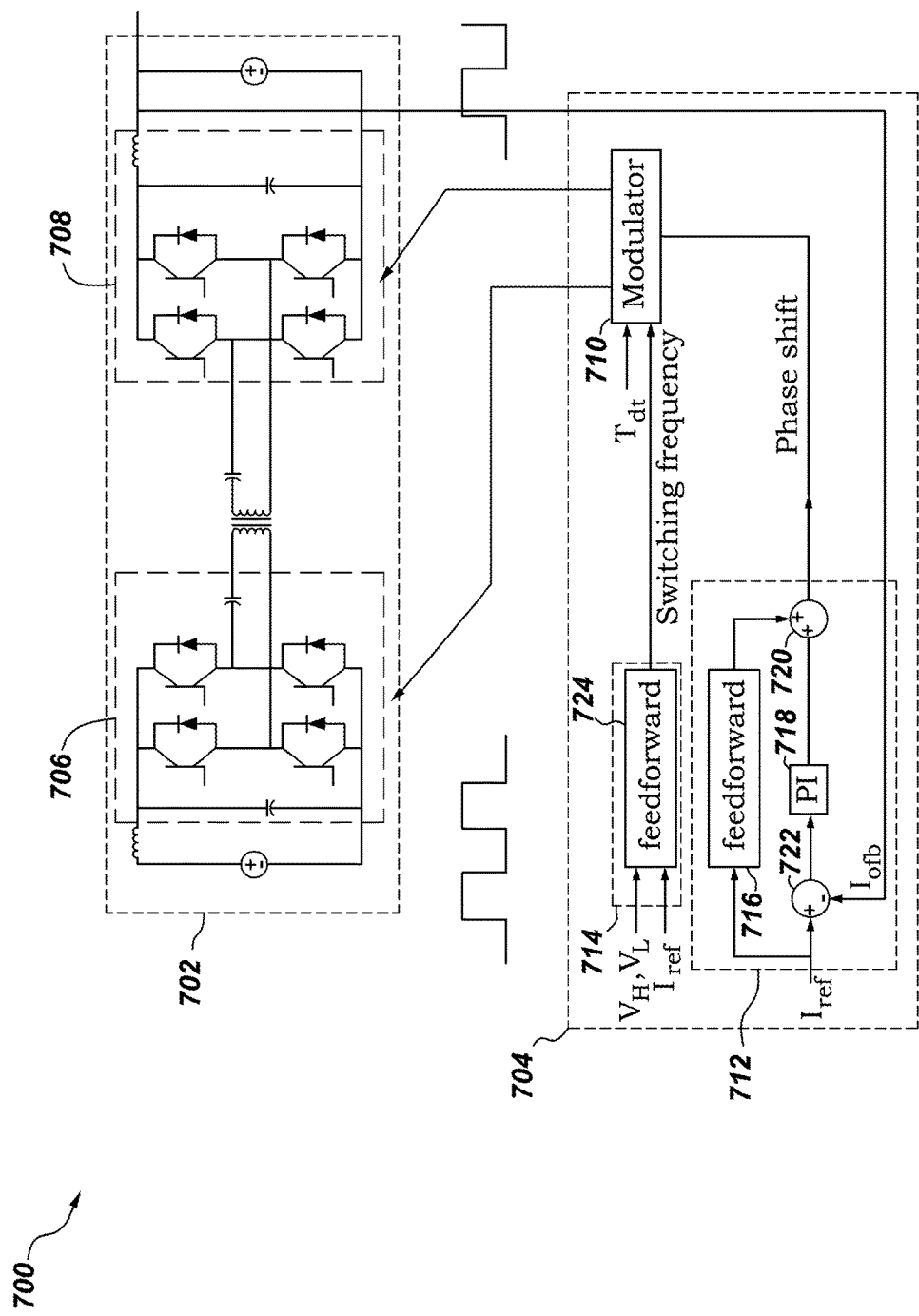
FIG. 8 is schematic representation of a resonant LLC dual active bridge converter and its controller, according to aspects of the present disclosure.

FIG. 8 shows schematic diagram 700 of a resonant LLC dual active bridge converter 702 and its controller 704 in accordance with an embodiment of the present technique. The controller 704 includes a modulator 710 which provides switching signals to a first bus converter 706 and second bus converter 708. The modulator 710 generates the switching signals based on a converter phase shift signal generated by a phase shift controller 712, a converter switching frequency signal generated by a switching frequency controller 714 and a converter dead time $T_{dt}$.

The phase shift controller 712 includes a first feedforward controller 716 and a proportional integral (PI) controller 718. The phase shift controller 712 receives a reference output current $I_{ref}$ as an input. The reference output current $I_{ref}$ may be determined by another controller (not shown) depending on external power command. In one embodiment, the reference output current $I_{ref}$ may be determined based on a voltage ratio command, where the voltage ratio refers to ratio of voltages V1 and V2. The phase shift controller 704 further receives a measured output current $I_{ofb}$ as a feedback from output terminals of second bus converter 708. The first feedforward controller 716 includes a lookup table which defines the soft switching characteristic as explained with respect to FIG. 6. Thus, as per the value of the reference output current $I_{ref}$, first feedforward controller 716 looks for a nearby value in the lookup table and accordingly determines a phase shift value which is then added with an output of the PI controller 718 by an addition block 720 to generate the phase shift signal. In one embodiment, first feedforward controller 716 may include a feedforward function instead of the lookup table to provide the phase shift value. The PI controller 718 provides an adjustment value near the phase shift value determined by first feedforward controller 716 based on a current error determined by a subtraction block 722. The adjustment value is determined based on a phase shift margin as explained with respect to FIG. 6. The current error is the error between the reference output current $I_{ref}$ and measured output current $I_{ofb}$. In other words, the first feedforward controller 716 provides a course tuning of the converter phase shift whereas the PU controller 718 provides fine tuning of the converter phase shift.

The switching frequency controller 714 includes a second feedforward controller 724 which receives input signals such as reference output current $I_{ref}$, a measured first DC bus voltage V1 and a measured second DC bus voltage V2. Similar to first feedforward controller 716, the second feedforward controller 724 includes the lookup table as explained with respect to FIG. 6. In another embodiment, second feedforward controller 724 may also include a feedforward function instead of the lookup table for providing values of switching frequency. Thus, as per the value of the reference output current $I_{ref}$ and the required voltage gain V1/V2, second feedforward controller 724 looks for a nearby value in the look up table and accordingly determines a switching frequency value.

Further, the converter deadtime $T_{dt}$ may be determined by another controller (not shown) which can provide another control dimension at second load current values. As explained earlier, at second load current values, frequency controller 714 keeps the switching frequency constant (e.g., the soft switching characteristic 608 shows a constant frequency f2 at the second load current) and phase shift controller 712 controls phase shift to achieve soft switching. Further, at the first load current value also the frequency controller 714 keeps the frequency constant (e.g., the soft switching characteristic 608 shows a constant frequency f1 at the first load current) and controller 704 controls phase as well as dead time to operate converter 702 in the soft switching mode. Finally, between the first and second load currents, frequency controller 714 controls switching frequency to achieve the soft switching mode.

Figure 9:
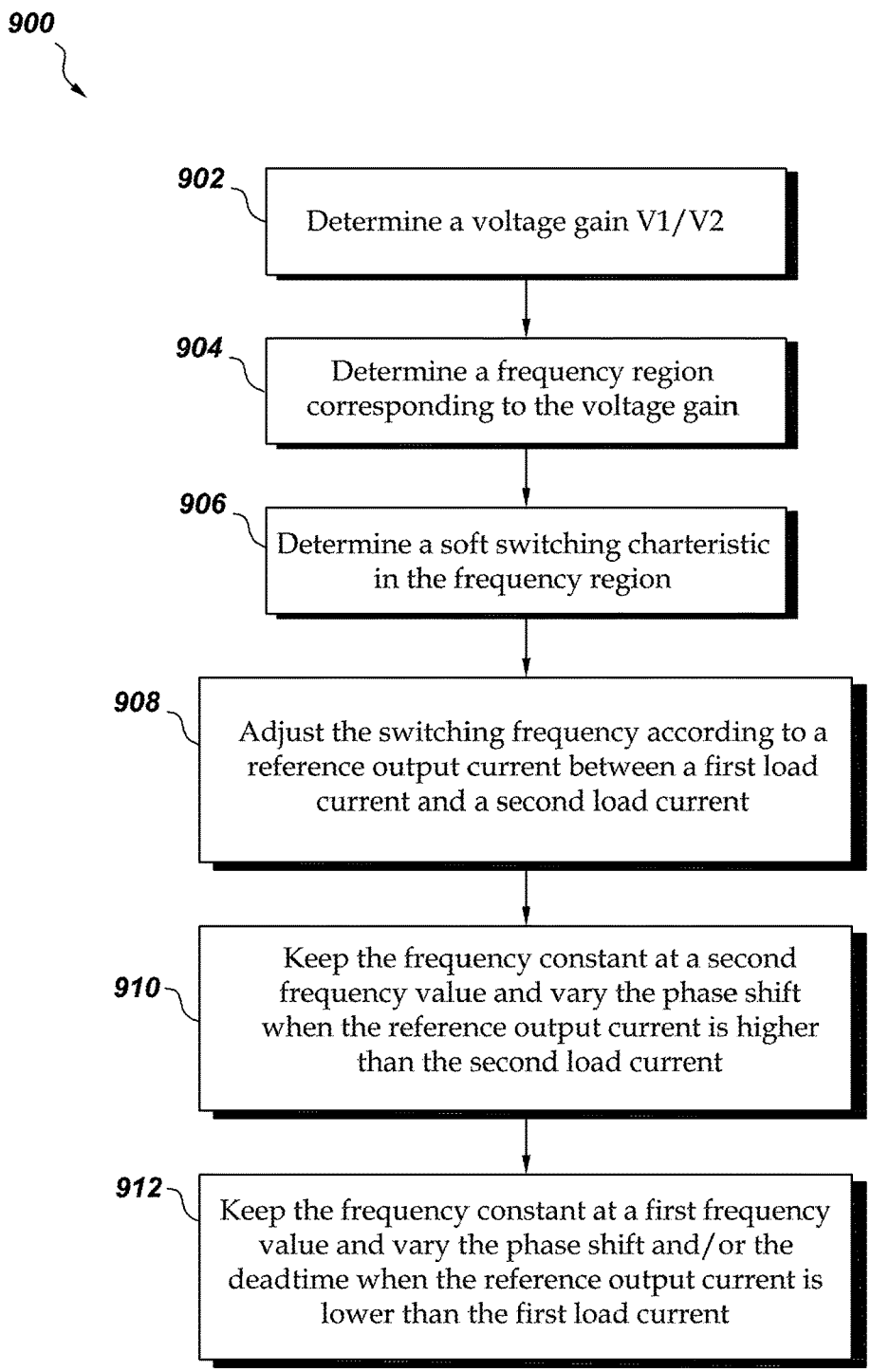
FIG. 9 is a flowchart representing a method of controlling a power converter, according to aspects of the present disclosure.

FIG. 9 shows a flowchart 900 explaining a method of controlling the power converter 200, in accordance with an embodiment of the present technique. At step 902, the method includes determining a required voltage gain for the converter 200. As explained earlier, the voltage gain is the ratio of the first bus voltage V1 and the second bus voltage V2. Further, in step 904, based on the voltage gain, a frequency region as explained with respect to FIG. 7 is determined. The frequency region basically determines upper switching frequency limit (or the second switching frequency) for the given voltage gain. In step 906, the method includes determining a soft switching characteristic in the frequency region as explained with respect to FIG. 6. Further, in step 908, the switching frequency is adjusted according to a reference output current for the reference output current value between a first load current value and a second load current value. During this period, a controller for the power converter may also adjust the phase shift slightly for tuning the power flow. In step 910, when the reference output current is higher than the second load current value, the controller keeps the frequency constant at the second switching frequency and adjusts the phase shift according to the reference output current value. Further, in step 912, when the reference output current is lower than the first load current value, the controller keeps the frequency constant at a value equal to the first switching frequency value and adjusts the phase shift and/or deadtime of the converter to meet the reference output current requirement. It should be noted that first load current value, the second load current value, the first switching frequency and the second switching frequency can all be determined from the soft switching characteristic which can be determined as explained with respect to FIG. 6.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A direct current (DC) to DC power converter, comprising:
a first bus converter for converting a first DC bus voltage into a first high frequency AC voltage;
a second bus converter for converting a second high frequency alternating current (AC) voltage into a second DC bus voltage;
a resonant circuit for coupling the first bus converter and the second bus converter;
a controller for providing switching signals to the first bus converter and the second bus converter to operate the power converter in a soft switching mode, wherein the controller comprises:
a switching frequency controller for determining a switching frequency signal for the power converter based on a reference output current, wherein when the reference output current is below a first load current value the switching frequency signal is maintained at a first switching frequency and when the reference output current is above a second load current value the switching frequency signal is maintained at a second switching frequency, and wherein when the reference output current is between the first load current value and the second load value, the switching frequency signal is adjusted according to a value of the reference output current; and
a phase shift controller for determining a phase shift signal for the power converter, wherein when the reference output current is lower than the first load current or higher than the second load current the phase shift is determined according to the reference output current, and wherein when the reference output current is between the first load current and the second load current the phase shift is determined based on the switching frequency, the reference output current and perturbations in the output current.

2. The power converter of claim 1, wherein the resonant circuit comprises:
a high frequency transformer coupled between the first bus converter and the second bus converter;
a first resonant capacitor coupled in series with a first resonant inductor, wherein terminals of the series connection are connected between one output terminal of the first bus converter and one AC input terminal of the high frequency transformer;
a second resonant inductor coupled across a first winding of the high frequency transformer; and
a second resonant capacitor connected between one AC output terminal of the high frequency transformer and one input terminal of the second bus converter.

3. The power converter of claim 2, wherein the phase shift controller comprises a first feedforward controller to determine a phase shift value and further comprises another controller which provides an adjustment value which when added with the phase shift value generates the phase shift signal for the power converter.

4. The power converter of claim 3, wherein the switching frequency controller comprises a second feedforward controller to determine the switching frequency signal based on the reference output current.

5. The power converter of claim 4, wherein the first feedforward controller and the second feedforward controller both include a feedforward function or a lookup table having a soft switching characteristic, wherein the soft switching characteristic is a predetermined characteristic representing values of converter switching frequencies and phase shifts for a plurality of output current values.

6. The power converter of claim 5, wherein the first load current value, the second load current value, the first switching frequency and the second switching frequency are determined based on the soft switching characteristic.

7. The power converter of claim 6, wherein the soft switching characteristics is determined based on a frequency region corresponding to a required voltage gain for the power converter.

8. The power converter of claim 7, wherein the first switching frequency is in between a series resonance frequency and an overall resonant circuit resonance frequency of the power converter and is determined based on system parameters.

9. The power converter of claim 8, wherein the second switching frequency is determined based the required voltage gain of the power converter.

10. The power converter of claim 1 comprising a transformerless coupling between the first bus converter and the second bus converter.

11. The power converter of claim 1, wherein the first bus converter and the second bus converter include bidirectional power converters.

12. The power converter of claim 1, wherein the first bus converter includes a plurality of switching devices, wherein each of the switching device includes series connected semiconductor switching having snubber circuits.

13. The power converter of claim 1, wherein the controller further regulates a converter dead-time when the reference output current is below the first load current value.

14. A method of operating a DC to DC power converter having a first bus converter coupled to a second bus converter by a resonant circuit, said method comprising:
adjusting a switching frequency of the power converter according to a reference output current when the reference output current is in between a first load current value and a second load value;
maintaining the switching frequency of the power converter at a first switching frequency when the reference output current is lower than a first current value;
maintaining the switching frequency of the power converter at a second switching frequency when the reference output current is higher than a second current value;
determining a phase shift value for the power converter based on the reference output current;
wherein when the reference output current is lower than the first load current or higher than the second load current the phase shift is determined according to the reference output current, and wherein when the reference output current is between the first load current and the second load current the phase shift is determined based on the switching frequency, the reference output current and perturbations in the output current.

15. The method of claim 14, wherein regulating the switching frequency and determining the phase shift value for the power converter both include generating a soft switching characteristic representing values of converter switching frequencies and phase shifts for a plurality of output current values and wherein the first load current value, the second load current value, the first switching frequency and the second switching frequency are determined based on the soft switching characteristic.

16. The method of claim 14 further comprising regulating a converter dead-time when the reference output current is below the first load current value.

17. A power system for a marine application, comprising:
an alternating current (AC) bus connected to a generator and supplying power to an auxiliary load;
a first direct current (DC) bus having a first DC voltage supplying power to a first load;
an AC to DC converter coupled between the AC bus and the first DC bus;
a second DC bus having a second DC voltage supplying power to a second load;
a DC to DC converter coupled between the first DC bus and the second DC bus, wherein the DC to DC converter comprises:
a first bus converter for converting a first DC bus voltage into a first high frequency AC voltage;
a second bus converter for converting a second high frequency alternating current (AC) voltage into a second DC bus voltage;
a resonant circuit for coupling the first bus converter and the second bus converter;
a controller for providing switching signals to the first bus converter and the second bus converter to operate the power converter in a soft switching mode, wherein the controller comprises:
a switching frequency controller for determining a switching frequency signal for the power converter based on a reference output current, wherein the when the reference output current is below a first load current value the switching frequency signal is maintained at a first switching frequency and when the reference output current is above a second load current value the switching frequency signal is maintained at a second switching frequency, wherein when the reference output current is between the first load current value and the second load value, the switching frequency signal is adjusted according to a value of the reference output current; and
a phase shift controller for determining a phase shift signal for the power converter based on the reference output current, wherein when the reference output current is lower than the first load current or higher than the second load current the phase shift is determined according to the reference output current, and wherein when the reference output current is between the first load current and the second load current the phase shift is determined based on the switching frequency, the reference output current and perturbations in the output current.

18. The power system of claim 17, wherein the resonant circuit comprises:
a high frequency transformer coupled between the first bus converter and the second bus converter;
a first resonant capacitor coupled in series with a first resonant inductor, wherein terminals of the series connection are connected between one output terminal of the first bus converter and one AC input terminal of the high frequency transformer;
a second resonant inductor coupled across a first winding of the high frequency transformer; and
a second resonant capacitor connected between one AC output terminal of the high frequency transformer and one input terminal of the second bus converter.

19. The power system of claim 18, wherein the phase shift controller comprises a feedforward controller to determine a phase shift value and further comprises another controller which provides an adjustment value which when added with the phase shift value generates the phase shift signal for the power converter.

20. The power system of claim 19, wherein the feedforward controller and the frequency controller both include a feedforward function or a lookup table having a soft switching characteristic, wherein the soft switching characteristic is a predetermined characteristic representing values of converter switching frequencies and phase shifts for a plurality of output current values.

21. The power system of claim 20, wherein the first load current value, the second load current value, the first switching frequency and the second switching frequency are determined based on the soft switching characteristic.

22. The power system of claim 17, wherein the controller further regulates a converter dead-time when the reference output current is below the first load current value.

* * * * *